United States Patent [19]

Secondiak

[11] Patent Number: 5,022,843
[45] Date of Patent: Jun. 11, 1991

[54] PYROHY MAKER

[75] Inventor: Loretta Secondiak, Alberta, Canada

[73] Assignee: 303576 Alberta Ltd., Calgary, Canada

[21] Appl. No.: 436,613

[22] Filed: Nov. 15, 1989

[30] Foreign Application Priority Data

Feb. 17, 1989 [CA] Canada .................. 591402

[51] Int. Cl.⁵ ............................................. A21C 11/10
[52] U.S. Cl. ..................................... 425/289; 30/316; 99/450.1; 425/298; 425/302.1; 425/383; 425/510
[58] Field of Search ................. 99/450.1, 450.2, 450.4, 99/450.5; 425/110, 112, 500, 510, 511, 289, 383, 298, 302.1, 305.1; 30/316

[56] References Cited

U.S. PATENT DOCUMENTS

| D. 114,900 | 5/1939 | Napolillo | D7/677 |
|---|---|---|---|
| D. 179,131 | 11/1956 | Frey | D7/672 |
| D. 203,612 | 2/1966 | Waller | D7/677 |
| 2,557,191 | 6/1951 | King | 30/316 |
| 2,568,284 | 9/1951 | Harrison | 30/316 |
| 2,665,649 | 1/1954 | Cesare | 425/299 |
| 2,983,233 | 5/1961 | Herrington | 30/316 |
| 3,004,340 | 10/1961 | Collins | 30/316 |
| 3,120,678 | 2/1964 | Glenny | 425/318 |
| 3,155,055 | 11/1964 | Nishkian | 72/334 |
| 3,765,282 | 10/1973 | Crain | 30/316 |
| 4,362,497 | 12/1982 | Lifshitz | 425/383 |
| 4,382,768 | 5/1983 | Lifshitz et al. | 425/510 |
| 4,516,923 | 5/1985 | Lifshitz et al. | 425/382 |
| 4,543,053 | 9/1985 | Jasniewski | 99/450.5 |

Primary Examiner—Jay H. Woo
Assistant Examiner—James P. Mackey
Attorney, Agent, or Firm—Stanley G. Ade; Murray E. Thrift; Adrian D. Battison

[57] ABSTRACT

Pyrohy makers usually comprise ordinary stamp out plastic molds or multiple molds, both of which often present difficulties in sealing the pyrohies and/or releasing same from the molds. Alternatively they include two or more moveable pieces which are expensive to produce and often difficult or awkward to operate. The present device is a circular cut out device with a depending outer rim which both cuts out and seals in one operation. It is designed to use on a sheet of dough upon which the filling is placed and the edge of the dough is then flipped over the filling whereupon part of the mold is engaged over the flipped portion to cut and seal the pyrohy in a substantially semi-circular configuration.

2 Claims, 2 Drawing Sheets

PYROHY MAKER

This invention relates to new and useful improvements in hand operated presses designed primarily for use in pyrohy making although of course they can be used for other purposes.

Most pyrohy makers include multiple molds or molds which cut out a circle of dough which then has to be folded over and then sealed around the perimetrical edges thereof. It is often difficult to seal the edges of such pyrohies formed by these molds and sometimes to release the formed pyrohies from the mold.

Other pyrohy makers include hinged parts which often require two hands to operate and which normally require a circle of pastry to be cut out first and then placed in the mold whereupon the filling is placed on the pastry and the mold operated in order to close and seal the pyrohy. This is obviously relatively time consuming and of course such multiple part pyrohy makers are relatively expensive.

PRIOR ART

U.S. Pat. No. Des. 179,131, Nov. 6, 1956, Walter I. Frey. This shows a pastry cutter with a broad band of crimping teeth on the lower perimeter thereof.

U.S. Pat. No. Des. 114,900, May 23, 1939, A. Napolillo. This shows a similar broad toothed crimping circle on the under side of the mold.

U.S. Pat. No. 2,665,649, Jan. 12, 1954, D.J. Cesare. This shows a device for cutting and forming meat patties and includes a separate cutter and includes means to crimp and which is easily adjusted for various thickness of articles to be prepared thereby.

U.S. Pat. No. 3,120,678, Feb. 11, 1964, C.S. Glenny. This shows a hamburger press which includes a ring body and a plunger for reciprocal movement therewith with a disk on the inner end to eject the patties cut by the ring.

U.S. Pat. No. 3,155,055, Nov. 3, 1964, A. Nishkian. This shows a patty shell forming device in which a circle of dough is pressed into a mold in a cup-like form.

U.S. Pat. No. 4,364,497, Dec. 7, 1982, I. Lifshitz. This also shows a food press form with the face of each product having a cutting edge knife conforming to the mold interior shape. It also includes a cooperatively shaped one piece negative pusher plug mold.

U.S. Pat. No. 4,382,768, May 10, 1983, Igor Lifshitz. This shows apparatus for making dough envelopes containing a fulling in which a cutter is used to cut out two circles of dough upon one of which is placed a filling whereupon the second circle of dough is placed on top and sealed around the perimeter thereof.

The present device is a simple one-part press type mold which enables pyrohies to be made rapidly and easily and which includes means whereby the pyrohy is first cut and then sealed in one operation.

One aspect of the invention is to provide a pyrohy maker comprising in combination a hollow press portion and a handle portion extending upwardly therefrom, said hollow press portion including means to cut out a substantially semi-circle of double thickness dough and means to seal the substantially semi-circular periphery thereof.

Another aspect of the present invention is to provide a mold in which the cutting rim not only cuts but also seals the outer peripheries or vertical surfaces of the cut pastry just prior to the horizontal sealing portion engages the pastry thus giving a much tighter seal which prevents the filling from bursting through the sealed edge during cooking.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

BRIEF DESCRIPTION OF THE DRAWINGS

In the drawings like characters of reference indicate corresponding parts in the different figures.

DETAILED DESCRIPTION

Proceeding therefore to describe the invention in detail, all of the embodiments shown in FIGS. 1 through 5 include a lower hollow press portion collectively designated 10 and an upper handle portion collectively designated 11.

The upper portion is formed as an extension of the lower portion and both are substantially cylindrical and hollow.

Figure 1:
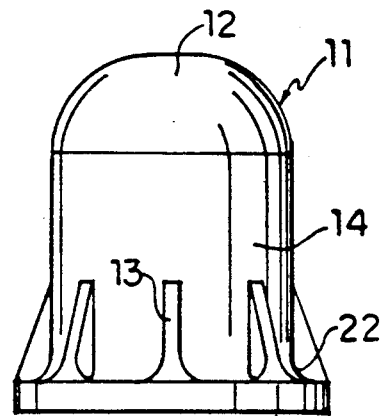
FIG. 1 is a side elevation of the preferred embodiment.
Figure 2:
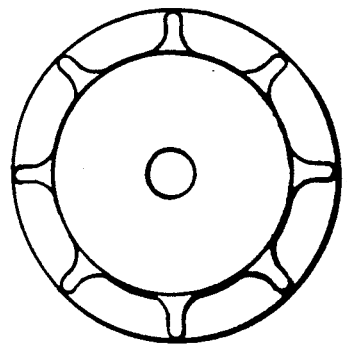
FIG. 2 is a top plan view of FIG. 1.
Figure 3:
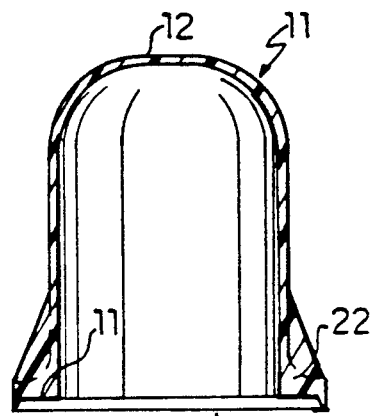
FIG. 3 is a cross-sectional view of FIG. 1.
Figure 4:
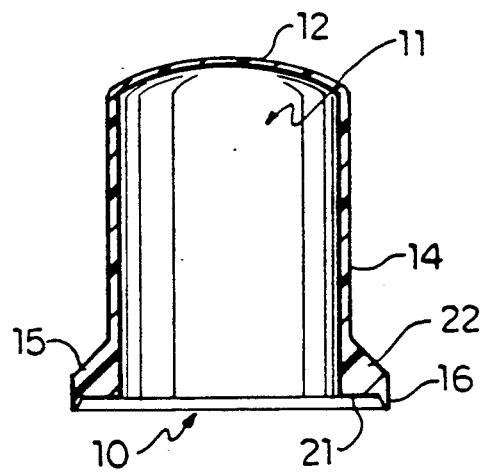
FIG. 4 is a cross-sectional view of an alternative embodiment.

FIG. 1 shows a dome shaped upper end 12 and shaped ribs 13 extending between the cylindrical portions 14 of the upper portion whereas FIG. 4 shows a thickened perimetrical band 15 extending around the lower end of the cylindrical portion 14.

Figure 5:
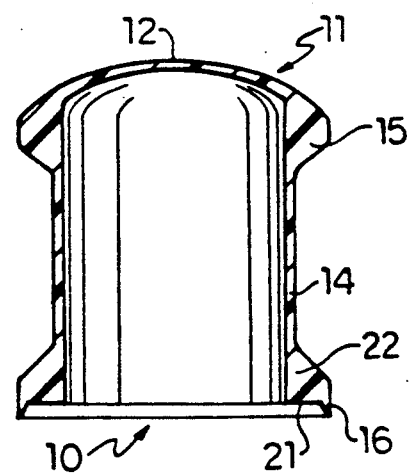
FIG. 5 is a cross-sectional view of a still further embodiment.

The upper or handle portion 11 of FIG. 5 is enlarged circumferentially to provide a better hand hold for the device.

Figure 6:
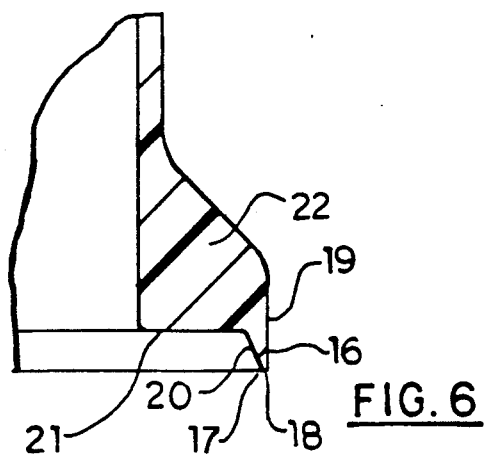
FIG. 6 is an enlarged fragmentary cross-sectional view of the cutter rim.
Figure 7:
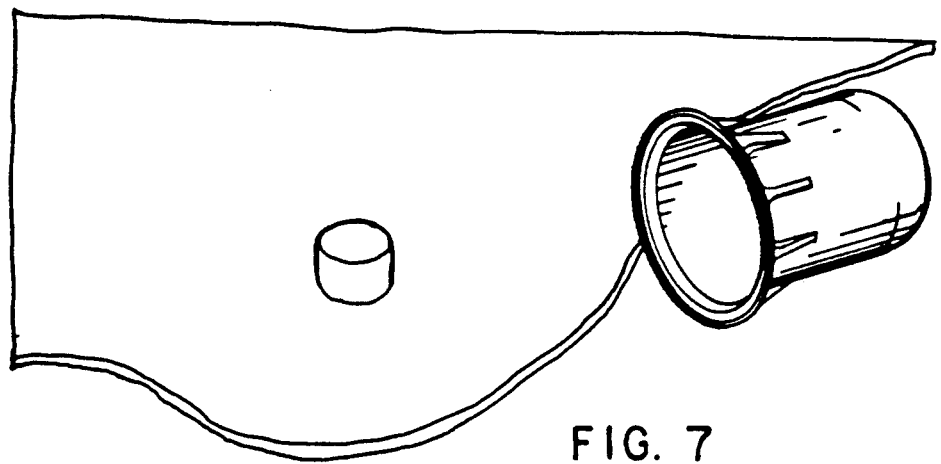
FIG. 7 is an isometric view showing the pyrohy pastry with the filling in place.

The hollow press portion 10 includes an outer perimetrical cutter rim 16 terminating with a lower perimetrical cutting edge 17 and preferably having a horizontal relatively narrow cutting edge 18 as shown in FIG. 6.

The outer side of this narrow horizontal portion 18 extends perpendicularly upwardly therefrom as indicated by reference character 19 and the inner wall 20 extends upwardly and inwardly to an inwardly extending, substantially horizontal sealing portion 21.

It will be noted that the lower end 17 of the cutting rim is situated in a plane spaced below the horizontal sealing portion 21.

The portion immediately above the horizontal sealing portion 21 is thickened and reinforced by the ribs 13 as clearly shown by reference character 22.

In operation, a sheet of dough 23 is rolled out upon a planar surface and the desired filling is formed into small balls as indicated in phantom by reference character 24.

A ball of filling is placed just inboard of the outer edge of the sheet of dough 23 whereupon this edge is flipped over as indicated by reference character 25, to enclose the ball of the filling.

Figure 8:
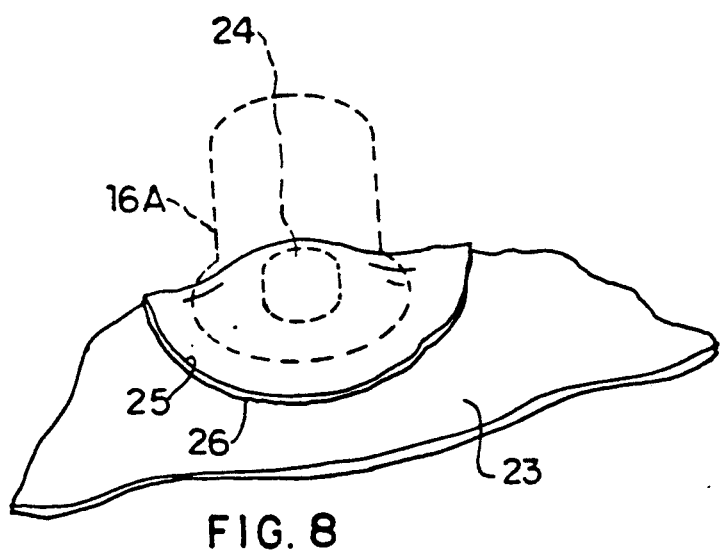
FIG. 8 is similar to FIG. 7 but with the pastry flipped over to cover the filling and showing the invention in phanton in position to form the pyrohy of FIG. 9.

The press device is then placed upon this double thickness of dough with the outer cutter rim 16 engaging the double thickness of dough just spaced inboard of the edge 26 of the flipped over portion and clearly shown in phantom in FIG. 8 and indicated by reference character 16A.

Figure 9:
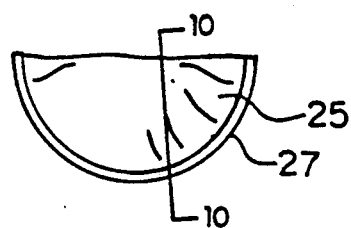
FIG. 9 shows a top plan view of the pyrohy formed by the pyrohy maker.
Figure 10:
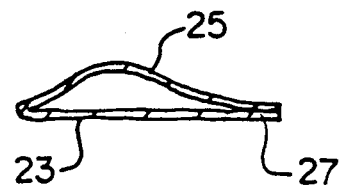
FIG. 10 is an enlarged fragmentary cross-sectional view substantially along the line 10—10 of FIG. 9.

It will be noted that under these circumstances, only a substantially semi-circular double thickness of dough is engaged by the device which is then pressed downwardly upon the double thickness so that the cutting rim 16 first cuts the double thickness and at the same time the sloping surface 20 smears these two edges together thus giving a primary seal whereupon the horizontal sealing surface 21 engages the upper surface of the folded over portion of the pastry and seals the two surfaces together to form a sealed band of pastry around this perimetrical edge indicated by reference character 27 in FIGS. 9 and 10.

Another ball of filling is then placed adjacent the edge of the dough 23 and the extending portion is again flipped over. The cutting and sealing action is preferably accomplished by pressing downwardly upon the device and at the same time turning it clockwise or anticlockwise which cuts and seals and separates the semi-circular pyrohy from the main body of the dough sheet.

If the filling is pre-formed into balls, it is very easy to form a great number of pyrohies rapidly and accurately with very little waste, which waste can in any event be collected together and rolled out into a further sheet and used up in the same manner.

It is important to note that although the pyrohy maker of this invention is a full circle, nevertheless it could be formed in a partial circle although it is easier to manipulate and position with the configuration shown.

Pyrohies formed in this fashion can either be cooked in any conventional manner or frozen until required and the excellent seal formed retains the filling within the envelope during the storage and cooking process.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A pyrohy maker comprising a single substantially cylindrical cup with an open end, an annular cutting ring surrounding the open end and having a free cutting edge, an inner frusto-conical face leading from the cutting edge, a substantially planar sealing surface extending inwardly from the frusto-conical face, and a substantially dome-shaped end opposite the cutting edge.

2. A pyrohy maker according to claim 1 wherein the cutting rim has a substantially cylindrical outer face meeting the frusto-conical face at the cutting edge.

* * * * *